US009811828B2

(12) United States Patent
Piva et al.

(10) Patent No.: US 9,811,828 B2
(45) Date of Patent: Nov. 7, 2017

(54) METHOD FOR AUTHENTICATION OF MOBILE TRANSACTIONS USING VIDEO ENCRYPTION AND METHOD FOR VIDEO ENCRYPTION

(71) Applicant: SAMSUNG ELETRÔNICA DA AMAZÔNIA LTDA., Campinas (BR)

(72) Inventors: Fabio R. Piva, Campinas (BR); Vanessa Testoni, Campinas (BR); Fernando L. Koch, Campinas (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 616 days.

(21) Appl. No.: 14/286,385

(22) Filed: May 23, 2014

(65) Prior Publication Data

US 2015/0278807 A1    Oct. 1, 2015

(30) Foreign Application Priority Data

Mar. 28, 2014    (BR) .......................... 1020140076662

(51) Int. Cl.

| H04L 29/06 | (2006.01) |
| G06Q 20/38 | (2012.01) |
| G06Q 20/32 | (2012.01) |
| G06Q 20/36 | (2012.01) |
| G06Q 20/40 | (2012.01) |
| G07F 7/08 | (2006.01) |

(52) U.S. Cl.

CPC ....... *G06Q 20/3829* (2013.01); *G06Q 20/322* (2013.01); *G06Q 20/36* (2013.01); *G06Q 20/3823* (2013.01); *G06Q 20/407* (2013.01); *G07F 7/084* (2013.01); *G07F 7/0813* (2013.01)

(58) Field of Classification Search

CPC ............... G06Q 20/3829; G06Q 20/36; G06Q 20/3823; G06Q 20/407; G06Q 20/322; G07F 7/084; G07F 7/0813

See application file for complete search history.

(56) References Cited

U.S. PATENT DOCUMENTS

| 5,715,316 A | * | 2/1998 | Steenblik | ................. | G09C 5/00 |
| | | | | | 273/157 A |
| 5,960,081 A | * | 9/1999 | Vynne | ................... | G06T 1/0085 |
| | | | | | 348/461 |

(Continued)

FOREIGN PATENT DOCUMENTS

| NL | WO 2004081870 A1 * | 9/2004 | ............... | G06T 1/00 |
| WO | WO 2004055757 A1 * | 7/2004 | ............. | G06F 21/60 |

*Primary Examiner* — David García Cervetti
(74) *Attorney, Agent, or Firm* — Staas & Halsey LLP (57) ABSTRACT

The present invention relates to a method which aims to improve data security in mobile payment transactions. To achieve this goal, we propose a highly secure method for transactions validation through video encryption and a new view of secrecy based on the combination of encrypted video (102, 203, 305) and a transparent safe card (110, 202, 307) with unique secret pattern (111, 308). This safe card (110, 202, 307) is shown as a translucent or transparent device capable of acting as "layer" or decoding mask using visual cryptography techniques. Additionally, it is proposed in one embodiment of the present invention a method for encryption of unencrypted video (602) through a frame analysis module (601) and a frame recomposition module (612).

9 Claims, 4 Drawing Sheets (56) References Cited

U.S. PATENT DOCUMENTS

| | | | |
|---|---|---|---|
| 6,285,774 B1* | 9/2001 | Schumann | H04N 5/913 375/E7.026 |
| 6,336,189 B1* | 1/2002 | Takeda | G06F 21/6209 726/2 |
| 6,473,132 B1* | 10/2002 | Foss | H04N 5/265 348/584 |
| 6,728,376 B1* | 4/2004 | Dean | G09C 5/00 283/17 |
| 6,813,710 B1* | 11/2004 | Wu | G06T 1/0057 382/166 |
| 7,184,059 B1* | 2/2007 | Fouladi | G06T 15/005 345/506 |
| 7,530,084 B2* | 5/2009 | Dawson | H04N 5/44504 345/629 |
| 8,150,034 B2* | 4/2012 | Hogl | G06F 21/84 380/208 |
| 8,379,908 B2* | 2/2013 | Davis | G06K 19/086 382/100 |
| 8,699,746 B2* | 4/2014 | Sarraf | H04N 1/32309 382/100 |
| 9,033,245 B2* | 5/2015 | Yates | G09C 5/00 235/435 |
| 2002/0101988 A1* | 8/2002 | Jones | G09C 5/00 380/54 |
| 2002/0122042 A1* | 9/2002 | Bates | G06F 17/30855 345/581 |
| 2003/0012406 A1* | 1/2003 | Iwamura | H04N 1/32203 382/100 |
| 2004/0001610 A1* | 1/2004 | Murakami | G06T 1/0028 382/100 |
| 2004/0028256 A1* | 2/2004 | Murakami | G06T 1/005 382/100 |
| 2004/0139330 A1* | 7/2004 | Baar | G06F 3/0481 713/182 |
| 2004/0170275 A1* | 9/2004 | Lee | G09C 5/00 380/54 |
| 2005/0044395 A1* | 2/2005 | Staring | G09C 5/00 726/26 |
| 2005/0117748 A1* | 6/2005 | Schrijen | G06F 21/83 380/200 |
| 2005/0140497 A1* | 6/2005 | Chiviendacz | B42D 25/305 340/5.67 |
| 2005/0144449 A1* | 6/2005 | Voice | G06F 21/34 713/169 |
| 2005/0144450 A1* | 6/2005 | Voice | G06F 21/34 713/169 |
| 2005/0144451 A1* | 6/2005 | Voice | G06F 21/34 713/170 |
| 2005/0149761 A1* | 7/2005 | Chiviendacz | B42D 25/351 726/19 |
| 2006/0015725 A1* | 1/2006 | Voice | H04L 63/0245 713/168 |
| 2006/0022059 A1* | 2/2006 | Juds | G06K 7/12 235/494 |
| 2006/0115082 A1* | 6/2006 | Kevenaar | G07D 7/0033 380/216 |
| 2006/0156385 A1* | 7/2006 | Chiviendacz | G06F 21/36 726/2 |
| 2007/0005967 A1* | 1/2007 | Mister | G06F 21/36 713/168 |
| 2007/0019836 A1* | 1/2007 | Thorwirth | G06T 1/0028 382/100 |
| 2007/0096946 A1* | 5/2007 | Kim | G09C 1/00 341/22 |
| 2008/0123860 A1* | 5/2008 | Choi | H04K 1/00 380/278 |
| 2009/0046856 A1* | 2/2009 | Mitchell | G09C 5/00 380/243 |
| 2009/0052666 A1* | 2/2009 | Rozado | G07D 7/0033 380/54 |
| 2009/0141931 A1* | 6/2009 | Yadid-Pecht | G06T 1/0035 382/100 |
| 2009/0147861 A1* | 6/2009 | Schnebly | G06T 1/0085 375/240.27 |
| 2009/0220076 A1* | 9/2009 | Kuraki | H04N 1/44 380/54 |
| 2009/0277968 A1* | 11/2009 | Walker | G06Q 20/347 235/494 |
| 2009/0322706 A1* | 12/2009 | Austin | G06F 3/038 345/175 |
| 2010/0077463 A1* | 3/2010 | Rickelton-Abdi | G06F 21/10 726/5 |
| 2010/0138912 A1* | 6/2010 | Bauchot | G06F 21/36 726/16 |
| 2010/0169649 A1* | 7/2010 | Haas | H04N 1/4486 713/176 |
| 2011/0026716 A1* | 2/2011 | Tang | G06F 21/43 380/284 |
| 2012/0154553 A1* | 6/2012 | Zustak | H04N 13/0452 348/51 |
| 2012/0180115 A1* | 7/2012 | Maitland | G06F 21/34 726/7 |
| 2012/0284799 A1* | 11/2012 | Roskind | G06F 21/6254 726/26 |
| 2012/0311651 A1* | 12/2012 | Kahn | H04N 21/23805 725/116 |
| 2014/0115472 A1* | 4/2014 | Mochinaga | H04N 13/0048 715/719 |
| 2014/0164772 A1* | 6/2014 | Forte | G06F 21/6209 713/171 |
| 2014/0270331 A1* | 9/2014 | Zhao | G06T 1/005 382/100 |
| 2014/0310531 A1* | 10/2014 | Kundu | G06F 21/35 713/186 |
| 2015/0006390 A1* | 1/2015 | Aissi | G06Q 20/40 705/44 |
| 2015/0016602 A1* | 1/2015 | de los Reyes | G06F 21/00 380/28 |
| 2015/0154598 A1* | 6/2015 | Forte | G06F 21/83 380/28 |
| 2015/0243258 A1* | 8/2015 | Howe | G06T 11/001 345/629 |
| 2016/0294785 A1* | 10/2016 | Lim | G06F 21/6209 |

* cited by examiner

METHOD FOR AUTHENTICATION OF MOBILE TRANSACTIONS USING VIDEO ENCRYPTION AND METHOD FOR VIDEO ENCRYPTION

FIELD OF THE INVENTION

The present invention relates to a method which aims to improve data security in mobile payment transactions. To achieve this goal, we propose a highly secure method of transaction validation through video encryption and a new form of secret visualization based on a combination of digital video and "physical decoding element" or safe card. This safe card is presented like a translucent or transparent device capable to act as a "layer" or decoding mask, using techniques of visual cryptography. Thus, in a preferred embodiment of the present invention, the method provides a highly secure and inventive solution for mobile banking authentication, transaction authentication and mobile payment. Additionally, it is proposed in one embodiment of the present invention a method for video encryption which makes the video robust against attempts to tamper the authentication process in a mobile transaction.

Therefore, the places that implement an embodiment of the methods proposed in the present invention will provide the unique physical decoding element or safe card for each end-user (i.e., each customer in a mobile banking service) and a specific encrypted video with a unique authentication key for each transaction, where the end-user can decode the secret key based on visual assessment of the video being decoded by the safe card and entering the key into some form of input, validating the transaction.

BACKGROUND OF THE INVENTION

Some methods and devices of the prior art assist in authentication of transactions based on secret keys and a count key that end-user can apply to provide the decoded secret validating the transaction. For example, the visual alphanumeric challenges (CAPTCHAs), token validators and visual validations of static images with physical decoding element.

However, there has been a need by banking corporations to attract people to use mobile banking interactions in order to reduce operational costs and enhance customer experience. Moreover, customers are constantly challenged with complicated authentication techniques (e.g., special devices, paper tables, etc. . . . ) and questions about transaction security. Thus, there is an opportunity to introduce new methods for transaction security that are easy to operate, visually attractive and safe. These methods aim to enhance the end-user experience while ensuring the security and the sense of safety.

The patent document EP 0260815 A1, titled: SECURE ENCODING METHOD AND ASSOCIATED PRODUCTS, published on Mar. 23, 1988, proposes a means for producing visual information that can only be retrieved when two random-looking shares are overlaid to each other. This method is the base of what is known in the literature as visual cryptography. The present invention differs from the document EP 0260815 A1 allowing one of the random-looking patterns to be printed on a physical safe card and safely reused in multiple transactions. Additionally, the present invention adapts visual cryptography to authentication contexts extending the concept of visual cryptography to sequential frames (i.e., video), as opposed to static images.

The patent document U.S. 20110026716 A1, titled: METHOD AND SYSTEM FOR ON-SCREEN AUTHENTICATION USING SECRET VISUAL MESSAGE, published on Feb. 3, 2011, presents an authentication method based on visual cryptography for scenarios in which authentication information is encoded into a static video cryptography share, which is transmitted to and displayed on a device and visually recoverable only upon overlaying the correct secret share on the display. The shares are produced through a (m, n) secret sharing scheme process. The present invention differs from this technique in the document U.S. 20110026716 A1 by proposing an efficient share production scheme, as opposed to (m, n) secret sharing and extending the concept of visual cryptography to sequential frames (i.e., video), as opposed to static images.

The patent document WO 2004081870 A1, titled: VISUAL CRYPTOGRAPHY SYSTEM, published on Sep. 23, 2004, introduces a system based on visual cryptography for sharing secrets that relies on two display-equipped devices, which can adaptively change their pixel sizes in order to make secret recovery (i.e., share alignment) easier. The present invention differs from this technique by introducing non-computational physical decoding element (i.e., the safe card), which will be aligned by the user to the device display for secret recovery. In addition, the pattern printed on the safe card may be safely reused in multiple transactions, and extends the concept of visual cryptography to sequential frames (i.e., video), as opposed to static images.

The patent document U.S. 20120284799 A1, titled: VISUAL CRYPTOGRAPHY AND VOTING TECHNOLOGY, published on Nov. 8, 2012, describes a method for applying visual cryptography to voting scenarios. The present invention differs from this technique by adapting the visual cryptography to authentication contexts, as opposed to voting context. Additionally, it allows the pattern printed on the safe card to be safely reused on multiple transactions, and extends the concept of visual cryptography to sequential frames (i.e., video), instead of static images.

The patent document CN 102 658 741, titled: VISUAL-CRYPTOGRAPHY-BASED VISIBLE ANTI-COPYING TECHNIQUE, published on Sep. 12, 2012, employs visual cryptography standards such as copy-detection watermarks, thus taking advantage of the difficulty of reliably reproducing such patterns with traditional copying equipment. The present invention differs from this technique by adapting the visual cryptography to authentication contexts, as opposed to copy-protection. Additionally, it allows the pattern printed on the safe card to be safely reused on multiple transactions, and extends the concept of visual cryptography to sequential frames (i.e., video), instead of static images.

The patent document U.S. 20050044395 A1, titled: SECURE DATA INPUT DIALOGUE USING VISUAL CRYPTOGRAPHY, published on Feb. 24, 2005, proposes a system based on visual cryptography for exhibiting dynamic input dialogs that can only be fully seen through overlaying a secret share on the display. Our invention differs from this technique by adapting the visual cryptography to authentication contexts, as opposed to input randomization. Additionally, it allows the pattern printed on the safe card to be safely reused on multiple transactions, and extends the concept of visual cryptography to sequential frames (i.e., video), as opposed to static images.

The patent document WO 2004055757 A1, titled: KEY SYNCHRONIZATION IN A VISUAL CRYPTOGRAPHIC SYSTEM, published on Jul. 1, 2004, introduces a two-device system for key establishment based on visual cryptography. One of the devices is used for displaying multiple session key shares, which reveal a session key when overlaid with one of the multiple user shares contained in the other device. The present invention differs from this technique by adjusting the visual cryptography to authentication contexts, as opposed to key establishment. Additionally, it allows the pattern printed on the safe card to be safely reused in multiple transactions (thus avoiding the requirement of keeping multiple safe cards, or equivalent complex devices for storing multiple patterns), and extends the concept of visual cryptography to sequential frames (i.e., video), as opposed to static images.

The patent document CN 102 394 751 B, titled: ONE-TIME PAD PASSWORD SYSTEM BASED ON VISUAL CRYPTOGRAPHY, published on Mar. 28, 2012, provides a one-time password system based on visual cryptography for authentication scenarios, which relies on a set of printed shares that can be only used one time each. The present invention differs from this technique by allowing the pattern printed on the safe card to be safely reused on multiple transactions, thus avoiding the requirement of keeping a set of printed shares and extending the concept of visual cryptography to sequential frames (i.e., video), as opposed to static images.

The patent document EP 1,579,380 B1, titled: AUTHENTICATION SYSTEM WITH VISUAL ENCRYPTION USING POLARISATION OF LIGHT, published on Sep. 28, 2005, with priority document EP 02,080,308 of Dec. 16, 2002, introduces an authentication system based on visual cryptography composed of a light polarization device, which can reveal a hidden secret image from within a host image upon overlaying. The overlaying is rotation-based, which means that multiple secrets can be revealed by the same pattern by changing the placement angle. The present invention differs from this technique by requiring that the secret pattern used for the information retrieval to be printed on a cheap transparent sheet or card, as opposed to light polarization devices, allowing the pattern printed on the safe card to be safely reused in multiple transactions without changing the overlaying angle and extending the concept of visual cryptography to sequential frames (i.e., video), as opposed to static images.

The patent document EP 1,509,879 B1, titled: TAMPER-RESISTANT VISUAL ENCRYPTION METHOD AND DEVICE, published on Mar. 2, 2005, introduces a polarization-based method for encrypting visual information. Retrieval is performed by overlaying with different rotation angles. The present invention differs from this technique by requiring that the secret pattern used for information retrieval to be printed on a cheap transparent sheet or card, as opposed to light polarization devices, the scalable video encoding settings for authentication, allowing the pattern printed on the safe card to be safely reused on multiple transactions without changing the overlaying angles, and extending the concept of visual cryptography to sequential frames (i.e., video), as opposed to static images.

SUMMARY OF THE INVENTION

The present invention describes a form to enhance the user experience while accessing a mobile client application or performing a mobile transaction, such as a banking service using mobile transfer in your mobile device. The method proposed in the present invention employs a safe, iterative and inventive technique by proposing a transaction authentication method based on the combination of a unique user decoding element containing a layer of secret visual cryptography and reusable and one video composed of coded frames through an encryption method containing a authentication code visually encrypted.

The proposed objectives are achieved by means of a method for authenticating mobile transaction in a client application running on the user's mobile device, the method comprising the steps of:
  detecting an user transaction authentication request through the client application;
  sending the authentication request from the client application to a server application being executed on a shared infrastructure;
  generating an authentication key for the transaction in the application server;
  generating an encrypted video with the secret authentication key generated embedded;
  sending the encrypted video with embedded secret key back to the client application being executed on the mobile device;
  displaying the encrypted video with embedded secret key in the client application;
  overlaying a safe card with reusable secret pattern on the screen during the video playback, allowing the user to view information related to the transaction and the secret authentication key generated;
  to confirm the validity of information, entering the secret authentication key viewed through an input device; and
  validating the transaction by comparing the inserted key with the generated secret authentication key.

The present invention uses the concept of decoding elements in a video, reducing the possibility of reverse engineering in the pattern printed on the safe card. The card security is a transparent physical element, preferably unique by user, that contains a visual pattern, and that allows to filter the video content, rendering an unreadable viewing at first to the end-user and revealing encrypted elements in the video.

The encrypted video is sent from the application server to the client application on the mobile device of user through any wireless infrastructure such as WiFi, GSM, or other e.g.

Additionally, a method is presented for video encryption for mobile transaction authentication, the method comprising the steps of:
  parsing a video into a clear set of static frames;
  processing the unencrypted frame in the video encryption module;
  executing an frame expansion module with the same extension factor as the safe card, so that each pixel becomes a square superpixel matrix with matching size to the superpixels of safe card;
  calculating a set of neighbors containing all white superpixels around any black superpixels in the unencrypted frame;
  calculating individually each superpixel of the unencrypted frame corresponding in a superpixel selection module according to a predefined criteria for the award of complement and non-complement; and
  recombining the encrypted frames in a frame recomposition module that generates the encrypted video.

The expansion module makes each pixel a matrix of square pixels (i.e., superpixel) with equal size to the superpixels in the safe card. The safe card unique pattern must cover pixel by pixel the encrypted video displayed on the mobile screen.

The step of calculating comprises superpixel calculating randomly a complement for the superpixel corresponding to the secret pattern if the superpixel corresponding to the unencrypted frame is black, calculating randomly a superpixel if the superpixel corresponding to the unencrypted frame is white and not neighbor and calculating randomly a non-complement for the superpixel corresponding to the secret pattern if the superpixel corresponding to the unencrypted frame is white and neighbor.

BRIEF DESCRIPTION OF THE FIGURES

The objectives and advantages of the invention will become apparent from the following detailed description of an exemplary and non-limiting embodiment from the following figures, wherein.

DETAILED DESCRIPTION OF THE INVENTION

Initially, we point out that the method described in the present invention preferably may be applied to mobile devices allowing flexibility and security. More specifically, in the preferred embodiments described below the proposed new methods for video encryption and authentication of mobile transactions are intended to user interfaces of mobile devices.

Figure 1:
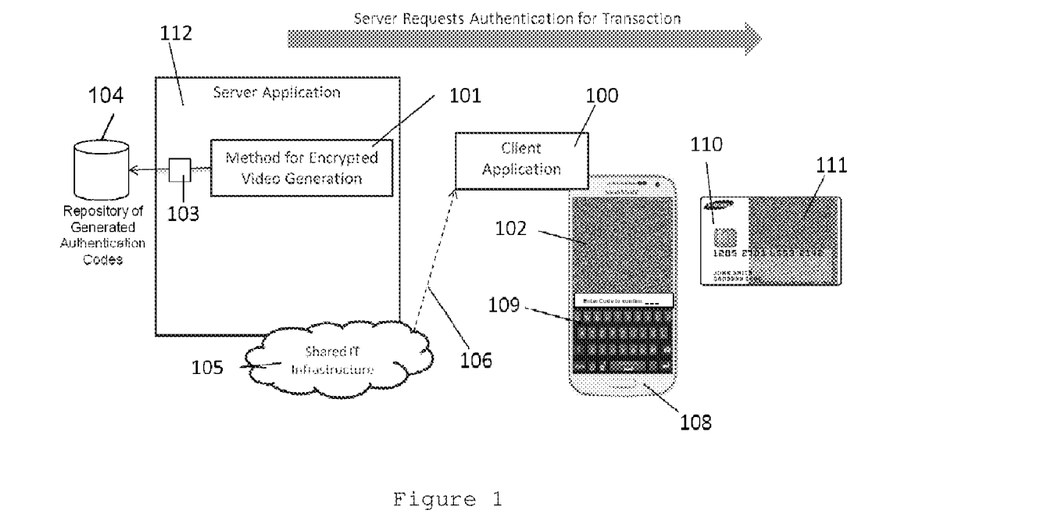
FIG. 1 shows an exemplar application of the preferred method of the invention in which the server requests authentication for a transaction.

FIG. 1 shows a possible embodiment of the method being applied in which the server requests authentication to perform a transaction. The process of server to challenge the user both to prove your identity and to confirm your intention to perform the operation in progress. Importantly, this step in which the server requests authentication occurs after the user has already asked the server to perform a transaction, which in turn, is being kept on hold by the server until the authentication is completed as will be seen in FIG. 3 below.

Client application software 100 through which the user initiates the transaction subjected to be authenticated by some form of input system 109 such as keyboard. A server application 112 is a software application that implements an embodiment of the present invention and executes a method for generating encrypted video 101, through which the server generates an encrypted video 102 containing the transaction data (to be confirmed by the user) and an authentication code 103 randomly generated. The application server temporarily stores the code 103 in a repository of authentication codes generated 104 and sends the encrypted video 102 to the user as an authentication request 106, through a communication infrastructure 105 (e.g., Wi-Fi, GSM or any other form of wireless communication).

Figure 2:
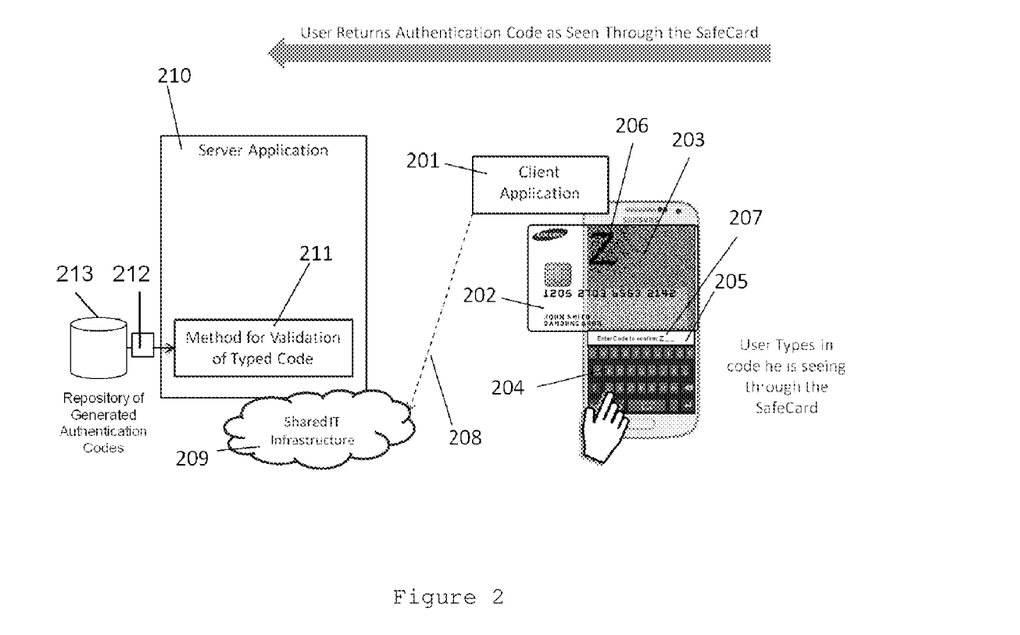
FIG. 2 shows an exemplar application of the preferred method of the invention in which the user returns the authentication code as revealed through the safe card.

The encrypted video 102 is received by the client application 100 that runs it on the mobile device 108 of user. The transaction started, so far waiting, is committed by the server only if the user retrieves successfully the correct authentication code 103 from the encrypted video 102 and sends it to the server, as shown in FIG. 2. Once, to perform this step, the user needs your unique safe card 110 —which has a unique secret pattern 111, only known by the user and the server. Receiving the correct answer from the user ensures the server that the transaction is genuine and was initiated by the legitimate user.

FIG. 2 shows a possible embodiment of the method being implemented wherein the user responds the challenge sent by the server in the form of an encrypted video 102. While the encrypted video is played by the client application on its mobile device 201, the user places his personal safe card 202 on the display as shown, so that his printed unique secret pattern matches exactly the encrypted video being played underneath. The overlay of the printed unique secret pattern and encrypted video reveals a decrypted video 203, which displays to the user his transaction information (for confirmation) and the authentication code generated randomly. The user checks that the transaction information is correct, and types it on the available input system 204 (e.g., a keyboard), in the input box 205, the code 206 he sees in the decrypted video 203.

When the user has finished typing, the client application 201 sends the typed code 207 to the server in an response authentication 208 through the same communication infrastructure 209 used in the previous steps. Upon receiving the authentication response 208, the application server 210 performs the method 211 for validation of the typed code to check if the received code 207 from the user in the authentication response 208 is equal to authentication code 212 that was generated for this transaction and stored in the repository of generated authentication codes 213. If the verification confirms the equality of codes, the server finally executes the transaction, otherwise the transaction is aborted.

Figure 3:
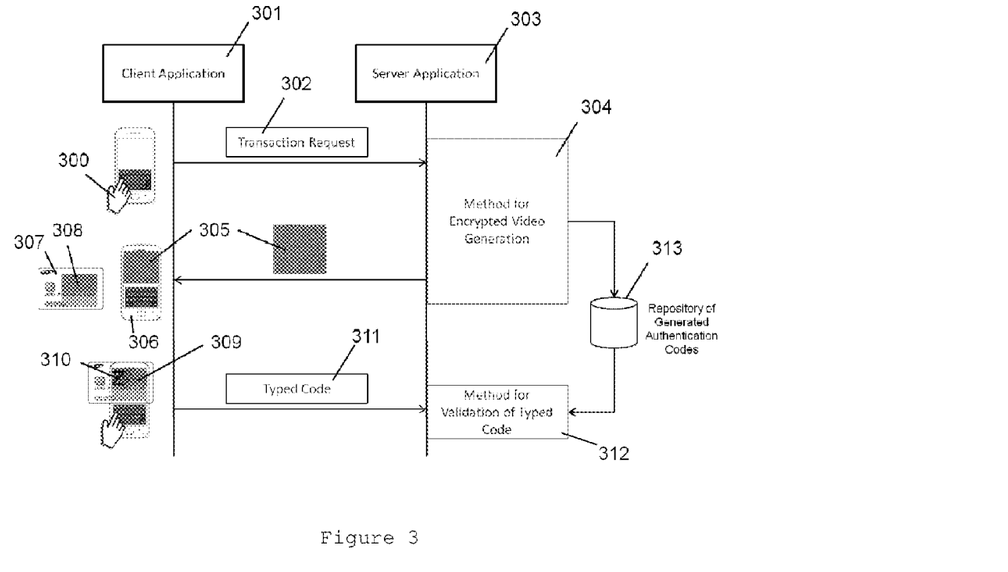
FIG. 3 shows an exemplary system that implements the preferred method of the invention for authenticating a transaction between a user and a server.

FIG. 3 describes a transaction between a user and a server in an exemplary system that implements the preferred method of the present invention as a solution for transactions authentication. The user 300 sends through the client application 301 running on the mobile device 306, a transaction request 302 to be received by the application server 303. This request contains 302 transaction parameters, such as destination account number and the value to be transferred, in the case of a bank money transfer, informing the server what the user wants it to follow. Before executing the transaction request 302, however, the server needs to ensure that it was in fact originated by the legitimate user, and not an impostor. Therefore, the application server 303 forwards the transaction request 302 to the method for encrypted video generation 304, thus keeping the transaction on hold while the authentication process occurs.

The method for encrypted video generation 304 outputs an encrypted video 305 containing the information from the transaction request 302 (for the purpose of confirmation) and also a authentication code 310 in order to check whether the user can see it, which proves the possession of user's unique personal safe card 307. The code 310 is also stored in the repository of generated authentication codes 313. The encrypted video 305 is then sent to the requesting user, and played on his mobile device 306 by the client application 301. At first, the user can not see any information other than noise-looking patterns, but it changes when he places his safe card 307 on the display and adjusts his unique printed secret pattern 308 to completely cover pixel-by-pixel the encrypted video 305.

The resulting video 309 reveals decrypted information to the user, while it maintains the safe card 307 in place, so that he can confirm that the parameters for his original transaction request 302 were received by the server without being changed by along the way, as well as learning the authentication code 310 that he needs to send to the server before his transaction request 302 is confirmed. The user then inputs the code 310 on his mobile device 306 and the underlying client application 301 sends the typed code 311 to the server application 303, and this response is now received and processed in the method for validation of typed codes 312. So the typed code 311 is compared to the authentication code 310 retrieved from the repository of generated authentication codes 313 and server application 303 decides whether to commit (if they are equal) or abort (if they are different) the transaction request 302.

Figure 4:
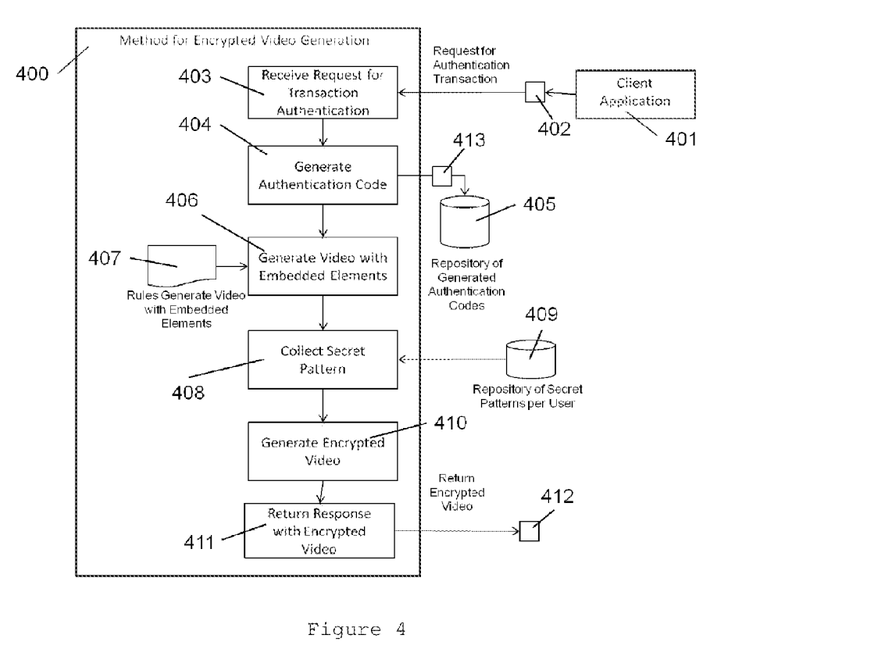
FIG. 4 shows a block diagram of the preferred method of the invention for validation of the code entered by the user through an encrypted video.

FIG. 4 presents elements and interactions of the method for encrypted video generation 400 detailing the interactions of the server application, which is the module responsible for generating the encrypted video that will be sent to the user. In FIG. 4, the following elements and interactions are encompassed: a module to receive requests for authentication 403, which receives a request 402 to authenticate a transaction Tx initiated by the user U through a client application 401, invokes a module to generate an authentication code 404 that implements an algorithm to generate the authentication code 413 for the transaction Tx and user U. The code 413 is stored in the repository of generated authentication codes 405 for further reference. Then, the process invokes the module to generate video 406 with embedded elements, applying the rules 407 for generating video with embedded elements and the algorithm to generate a video V(Tx,U) as an animated sequence of frames containing transaction-related embedded information and authentication code 413. The process proceeds by invoking the method to collect the secret pattern 408 to retrieve the pattern SP(U), which matches the pattern printed on the user's safe card from the repository of secret patterns per user 409. Then, the process invokes the method to generate encrypted video 410 that implements an algorithm with an embodiment of the method proposed in the present invention. The method results in an encrypted video 412 that can only be seen with user's safe card, since it was produced from his unique pattern SP(U). The video 412 is finally sent to the user U by the module to return the response 411.

Figure 5:
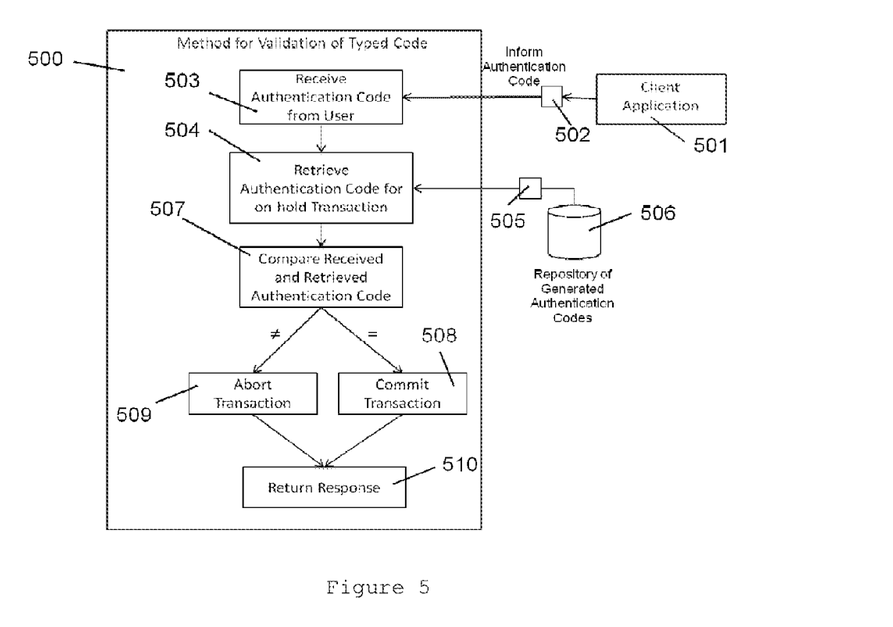
FIG. 5 shows a block diagram of video encoding used in the preferred method of the present invention.

In FIG. 5, elements and interactions of the method for validation of typed code 500 in a server application, which is responsible for receiving and processing the authentication response 502 containing the code typed by the user and sent by the client application 501 are presented. For that, it first receives the arriving authentication response 502 in the module to receive authentication response 503 from the user. Then, the module to retrieve authentication code 504 for on-hold transaction retrieves the previously-stored authentication code 505 for the current transaction from authentication codes generated repository 506. The retrieved code 505 and received code 502 are then compared in module to compare authentication received and retrieved codes 507. If they are equal, the transaction is committed by the module to commit transaction 508, and if they are different, the transaction is aborted by module to abort transaction 509. Either way, the response is generated regarding the success or failure of the transaction by the module to return response 510.

Figure 6:
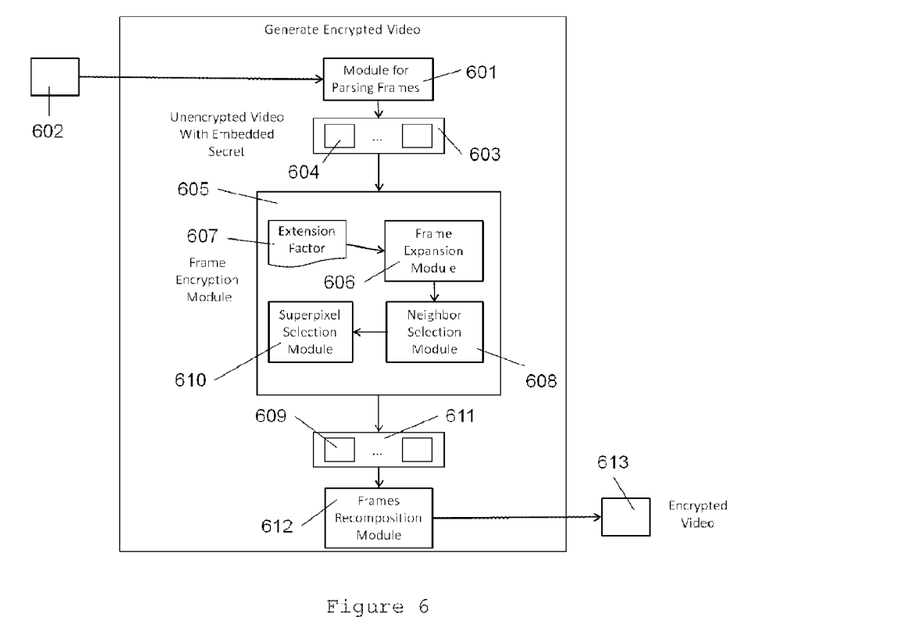
FIG. 6 shows a block diagram for generating an encrypted video according to a preferred embodiment of the method of the present invention.

FIG. 6 shows a block diagram that describes the operations of the method to generate encrypted video, according to a preferred embodiment of the invention. The method uses a module for parsing frames 601 and a module for restoration of frames 612. The frame parsing module 601 divides the unencrypted video 602 with embedded elements into a set of static frames 603. Each unencrypted frame 604 is then processed by a frame encryption module 605. The frame encryption module 605 is preferably comprised of a frame expansion module 606, a neighbor selection module 608 and a superpixel selection module 610. First, the unencrypted frames 604 are extended in a frame expansion module 606 to the same extension factor as the user's unique secret pattern 607, printed on safe card, so that each pixel becomes a square pixel matrix (i.e., superpixel) with matching size to the superpixels on the safe card. After that, a neighbor selection module 608 calculates a set containing the coordinates of all nearby surrounding white superpixels around any black superpixels on the unencrypted frame 604. Each superpixel of the correspondent encrypted frame 609 is then calculated individually in a superpixel selection module 610, as follows:

- if the corresponding superpixel from the unencrypted frame 604 is black, then a complement to the corresponding superpixel from the personal secret pattern is randomly calculated.
- if the corresponding superpixel from the unencrypted frame 604 is white and is not in the neighbor set, a random superpixel is calculated.
- if the corresponding superpixel from the unencrypted frame 604 is white and in the neighbors set, a non-complement the corresponding superpixel from personal secret pattern is randomly calculated.

The encrypted frames 611 are then recombined in a frames recomposition module 612, which outputs the encrypted video 613.

Figure 7:
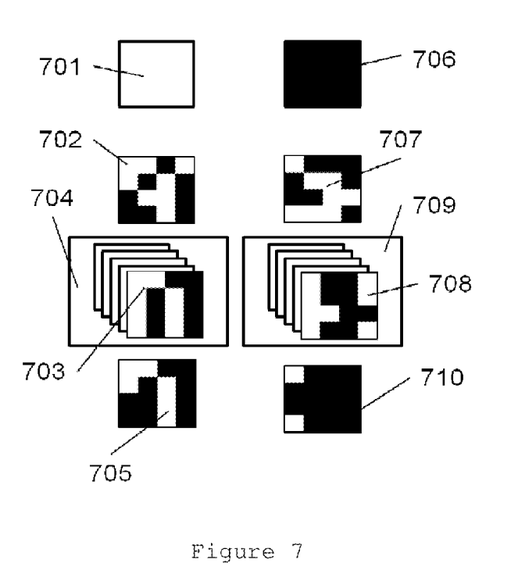
FIG. 7 shows an exemplary operation of a superpixel selection module with the extension factor of 4, according to a preferred embodiment of the method of the present invention.

In FIG. 7 is shown an exemplary method of operation of the superpixel selection module, assuming a extension factor 4, which implies on 4×4 superpixels containing eight black pixels and eight white pixels as components of both the personal secret pattern printed on the safe card and each of the encrypted frames. Other parameters for this example are black threshold bt=14 and white threshold wt=10. For a particular white superpixel 701 from the frame, is defined a correspondent personal secret pattern superpixel 702. If the white superpixel 701 is not in the set neighbor calculated in the neighbor selection module, a random superpixel is calculated and included in encrypted frame, regardless of the impact it may have on the overlay contrast. If, however, the white superpixel 701 is in the neighbor set, then add a non-complement 703 to superpixel 702 is randomly chosen from the set 704 of possible non-complement alternatives and included in the encrypted frame. A non-complement is defined as a superpixel that, when overlaid to the superpixel 702 of interest, results in overlay superpixel 705 with a quantity of black pixels equal or smaller to wt (white threshold).

For a particular black superpixel 706 from the frame, on the other hand, let be the correspondent personal secret pattern superpixel 707. Therefore, an complement superpixel 708 to 707 is randomly chosen from the set 709 of possible complementary alternatives, and included in the encrypted frame. Complement is defined by a superpixel that when overlaid to the superpixel 707 of interest, results in an overlay superpixel 710 with a number of black pixels greater than or equal to bt (threshold black).

It is also interesting to notice that in this example, there are 12,870 possible 4×4 superpixels containing eight black and eight white pixels, as opposed to the original visual cryptography method (Naor et al. 1994), in which there are mere six possible 2×2 superpixels containing two black pixels and two white pixels. For each of these 12,870 superpixels, given bt=14 and WT=10, both the set 704 of possible non-complement alternatives and the set 709 of possible complement alternatives have the same size containing 849 superpixels each, while the original visual cryptography method each superpixel had only one complement and non-complement. The following table compares both scenarios according to number of choices:

|  | Original Visual Cryptography (extension factor 2) | Current Method, with the parameters from FIG. 7 |
| --- | --- | --- |
| Number of Possible Super-pixels | 6 | 12870 |
| Non-complement Set | 1 | 849 |
| Complement Set | 1 | 849 |

Therefore, in the original method of visual cryptography, an attacker would be able to guess the value of a superpixel in the personal secret pattern, by simply analyzing a small number of encrypted frames (two or three would be sufficient to deduce almost the entirety of the personal secret pattern, given that most of superpixels in the frame constitute non-complements, which happen to be identical to their correspondent secret superpixel in the personal secret pattern). In the present invention, however, most of the encrypted frame is composed by randomly-chosen superpixels from all the 12,870 alternatives, and hold no relationship whatsoever with the correspondent personal secret pattern superpixel 702. The remaining non-random superpixels from the encrypted frame are chosen from complement and non-complement sets. It should be noticed that even if the attacker knows that a specific superpixel is, for example, a complement to the correspondent personal secret pattern superpixel 702, he still has to guess which one is the superpixel 702 among all 849 alternatives.

Finally, in order to breach security, not only the attacker would have to perform the above mentioned analysis for each superpixel in the encrypted frame, but also he would have to figure out which frames from the encrypted video contain any correlation with the personal secret pattern in that particular superpixel location, and which correlation (i.e., complement, non-complement) that is.

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

The invention claimed is:

1. A method for authenticating mobile transactions using video encryption in a client application running on a mobile device, the method comprising:
   detecting an authentication request for a transaction through the client application;
   sending the authentication request of the client application to a server application;
   generating a random authentication key for the transaction in the server application based on a neighbor set of a superpixel of a frame including the random authentication key, non-complement sets of the superpixel, and complement sets of the superpixel;
   generating an encrypted video embedded with the generated authentication key;
   sending the encrypted video with the embedded authentication key to the client application running on the mobile device;
   displaying the encrypted video with the embedded authentication key in the client application;
   overlaying a safe card with a reusable secret pattern on a screen of the mobile device during video playback allowing a user to view information related to the transaction and the authentication key;
   entering, by the user, the embedded authentication key revealed with the overlaid safe card, and
   validating the transaction by comparing the entered authentication key with the embedded authentication key.

2. The method of claim 1, wherein the executing the encrypted video comprises displaying the video in an unreadable form if the user is not using the safe card.

3. The method of claim 1, wherein the sending the encrypted video is performed using any wireless communication infrastructure.

4. The method of claim 1, wherein the overlaying the safe card comprises positioning the reusable secret pattern of the transparent safe card in a given position pixel-by-pixel over the encrypted video.

5. A method for video encryption applied to the authentication of mobile transactions, the method comprising:
   dividing an unencrypted video with embedded elements in a static unencrypted frame set in a frame analysis module;
   processing the unencrypted frame in a frame encryption module;
   performing an frame expansion with a same extension factor as a safe card;
   obtaining a set of neighbors containing all near white superpixels around any black superpixels in the unencrypted frame through a neighbors selection module;
   calculating, individually, each superpixel of the encrypted frame correspondent in a superpixel selection module, according to a predetermined criteria for complement and non-complement; and
   recomposing the encrypted frames in a frame recomposition module that generates the encrypted video.

6. The method of claim 5, wherein the executing the frame expansion makes each pixel a square matrix of pixels of equal size to the superpixels in the safe card.

7. The method of claim 5, wherein the calculating the superpixel comprises calculating randomly a complement to the superpixel corresponding to a secret pattern if the superpixel corresponding to the unencrypted frame is black.

8. The method of claim 5, wherein the calculating the superpixel comprises calculating randomly a superpixel if the superpixel corresponding to the unencrypted frame is white and not a neighbor.

9. The method of claim 5, wherein the calculating the superpixel comprises calculating randomly a non-complement for the corresponding superpixel of a secret pattern if the superpixel corresponding to the unencrypted frame is white and a neighbor.

* * * * *

UNITED STATES PATENT AND TRADEMARK OFFICE
CERTIFICATE OF CORRECTION

PATENT NO. : 9,811,828 B2  
APPLICATION NO. : 14/286385  
DATED : November 7, 2017  
INVENTOR(S) : Fabio R. Piva et al.

Page 1 of 1

It is certified that error appears in the above-identified patent and that said Letters Patent is hereby corrected as shown below:

On the Title Page

Item [73] (Assignee), Line 14:
Delete "ELECTRÔNICA" and insert -- ELETRÔNICA --, therefore.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*